US011169274B2

(12) United States Patent
Viswanathan et al.

(10) Patent No.: US 11,169,274 B2
(45) Date of Patent: Nov. 9, 2021

(54) METHOD, APPARATUS, AND COMPUTER PROGRAM PRODUCT FOR ESTABLISHING LOCATION

(71) Applicant: HERE Global B.V., Eindhoven (NL)

(72) Inventors: Anirudh Viswanathan, Berkeley, CA (US); Peter Christian, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 452 days.

(21) Appl. No.: 16/174,880

(22) Filed: Oct. 30, 2018

(65) Prior Publication Data
US 2020/0132858 A1 Apr. 30, 2020

(51) Int. Cl.
*G01S 19/28* (2010.01)
*G01S 19/42* (2010.01)
(Continued)

(52) U.S. Cl.
CPC .............. *G01S 19/28* (2013.01); *G01S 19/42* (2013.01); *G05D 1/0088* (2013.01); (Continued)

(58) Field of Classification Search
CPC ....... G01S 19/28; G01S 19/42; G05D 1/0088; G05D 1/0278; G05D 2201/0212; G05D 2201/0213
See application file for complete search history.

(56) References Cited

U.S. PATENT DOCUMENTS 5,716,301 A * 2/1998 Wild ..................... G01C 21/26
477/97
9,151,619 B2 10/2015 Venkatraman
(Continued)

FOREIGN PATENT DOCUMENTS

JP          2005 114601 A    4/2005
WO     WO 2006/118494 A1    11/2006

OTHER PUBLICATIONS

I. Skog et al., In-Car Positioning and Navigation Technologies—A Survey, IEEE Transactions on Intelligent Transportation Systems, vol. 10(1), p. 4-21, Mar. 2009 (Year: 2009).*
(Continued)

*Primary Examiner* — Bernarr E Gregory
*Assistant Examiner* — Fred H Mull
(74) *Attorney, Agent, or Firm* — Alston & Bird LLP

(57) ABSTRACT

A method is provided for establishing a location of a device based on a global navigation satellite system. Methods may include: receiving sensor data of an environment of the apparatus; estimating object location within the environment based on the sensor data; receiving a static elevation mask; generating a learned-elevation mask based, at least in part, on the static elevation mask and the estimated object location within the environment; receiving signals from a plurality of Global Navigation Satellite System (GNSS) satellites; filtering the signals from the plurality of GNSS satellites to eliminate from consideration a subset of satellites established as not having a line-of-sight with the apparatus; establishing a location of the apparatus from remaining satellites established as having a line-of-sight with the apparatus; and providing for at least one of route guidance or autonomous vehicle control based on the established location of the apparatus.

20 Claims, 7 Drawing Sheets

(51) Int. Cl.
*G05D 1/00* (2006.01)
*G05D 1/02* (2020.01)

(52) U.S. Cl.
CPC ... *G05D 1/0278* (2013.01); *G05D 2201/0212* (2013.01); *G05D 2201/0213* (2013.01)

(56) References Cited

U.S. PATENT DOCUMENTS

| | | |
|---|---|---|
| 9,507,028 B1 | 11/2016 | Yoo |
| 9,681,269 B2 | 6/2017 | MacGougan et al. |
| 9,857,474 B2 | 1/2018 | Tan et al. |
| 2010/0176992 A1 | 7/2010 | T'siobbel |
| 2014/0266876 A1* | 9/2014 | Tan ................... G01S 19/42 342/357.42 |
| 2014/0266884 A1 | 9/2014 | Raghupathy et al. |
| 2017/0003395 A1 | 1/2017 | Sasaki et al. |

OTHER PUBLICATIONS

Extended European Search Report for Application No. EP 19205992.1 dated Mar. 31, 2020, 10 pages.

Suzuki, T. et al., *Multipath Mitigation Using Omnidirectional Infrared Camera for Tightly Coupled GPS/INS Integration in Urban Environments*, 24th International Technical Meeting of the Satellite Division of The Institute of Navigation (Sep. 2011) 2914-2922.

Glans, F., *Enhanced Positioning in Harsh Environments*, Linkopings University (Jun. 3, 2013), 81 pages.

* cited by examiner

METHOD, APPARATUS, AND COMPUTER PROGRAM PRODUCT FOR ESTABLISHING LOCATION

TECHNOLOGICAL FIELD

An example embodiment of the present invention relates to establishing a location of a device based on a global navigation satellite system, and more particularly, to filtering the satellites used for establishing the location of the device based on an established likelihood of accuracy of the solution provided by the satellites.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server.

Methods of establishing the location of a device for navigation purposes has been an age-old problem with solutions ranging from compasses to following stars in the sky. More recently, satellite-based locationing means have provided a relatively accurate mechanism for establishing the location of a device capable of communicating with the navigational satellites. However, the accuracy of satellite-based locationing and navigation remains a challenge, particularly as precise locationing becomes necessary for applications such as autonomous vehicle control.

BRIEF SUMMARY

A method, apparatus, and computer program product are provided in accordance with an example embodiment for establishing a location of a device based on a global navigation satellite system, and more particularly, to filtering the satellites used for establishing the location of the device based on an established likelihood of accuracy of the satellites. According to an example embodiment described herein, an apparatus may be provided to facilitate autonomous or semi-autonomous control of a vehicle comprising at least one processor and at least one non-transitory memory including computer program instructions stored thereon. The computer program code instructions configured to, when executed, cause the apparatus to at least: receive sensor data of an environment of the apparatus; estimate object location within the environment based on the sensor data; receive a static elevation mask; generate a learned-elevation mask based, at least in part, on the static elevation mask and the estimated object location within the environment; receive signals from a plurality of Global Navigation Satellite System (GNSS) satellites; filter the signals from the plurality of GNSS satellites to eliminate from consideration a subset of satellites established as not having a line-of-sight with the apparatus; establish a location of the apparatus from remaining satellites established as having a line-of-sight with the apparatus; and provide for at least one of route guidance or autonomous vehicle control based on the established location of the apparatus.

According to some embodiments, the apparatus may further be caused to retrieve at least one previously generated learned-elevation mask, where causing the apparatus to generate a learned-elevation mask based, at least in part on the static elevation mask and the estimated object location within the environment may include causing the apparatus to generate a learned-elevation mask based, at least in part, on the static elevation mask, the estimated object location within the environment, and the at least one previously generated learned-elevation mask. The sensor data may be generated by at least one of an image sensor or a Light Distancing and Ranging (LiDAR) sensor. The at least one of the image sensor or LiDAR sensor may be associated with the vehicle. Causing the apparatus to estimate object location within the environment may include causing the apparatus to perform semantic segmentation on the sensor data to estimate a location of at least one of buildings, vegetation, and geological features within the environment.

Causing the apparatus to provide for at least one of route guidance or autonomous vehicle control based on the established location of the apparatus may include causing the apparatus to: map match the established location with a road segment; retrieve data associated with the road segment in response to map matching the location of the road segment; and provide for at least one of route guidance or autonomous vehicle control based on the retrieved data associated with the road segment. The retrieved data associated with the road segment may include rules associated with travel along the road segment and causing the apparatus to provide for at least one of route guidance or autonomous vehicle control based on the retrieved data may include causing the apparatus to control a speed of the vehicle according to the rules associated with travel along the road segment.

Embodiments described herein may provide a computer program product including at least one non-transitory computer-readable storage medium having computer-executable program code instructions stored therein. The computer-executable program code instructions may include program code instructions to: receive sensor data of an environment of the apparatus; estimate object location within the environment based on the sensor data; receive a static elevation mask; generate a learned-elevation mask based, at least in part, on the static elevation mask and the estimated object location within the environment; receive signals from a plurality of Global Navigation Satellite System (GNSS) satellites; filter the signals from the plurality of GNSS satellites to eliminate from consideration a subset of satellites established as not having line-of-sight with the apparatus; establish a location of the apparatus from remaining satellites established as having a line-of-sight with the apparatus; and provide for at least one of route guidance or autonomous vehicle control based on the established location of the apparatus.

According to some embodiments, the computer program product may include program code instructions to retrieve at least one previously generated learned-elevation mask, where the program code instructions to generate a learned-elevation mask based, at least in part, on the static elevation mask and the estimated object location within the environment may include program code instructions to generate a learned-elevation mask based, at least in part, on the static elevation mask, the estimated object location within the environment, and the at least one previously generated learned-elevation mask. The sensor data may be generated by at least one of an image sensor or a Light Distancing and Ranging (LiDAR) sensor. The at least one of an image sensor or LiDAR sensor may be associated with a vehicle. The program code instructions to estimate object location within the environment may include program code instructions to perform semantic segmentation on the sensor data to estimate a location of at least one of buildings, vegetation, and geological features within the environment.

The program code instructions to provide for at least one of route guidance or autonomous vehicle control based on the established location of the apparatus may include program code instructions to: map match the established location with a road segment; retrieve data associated with the road segment in response to map matching the location of the apparatus to the road segment; and provide for at least one of route guidance or autonomous vehicle control based on the retrieved data associated with the road segment. The retrieved data associated with the road segment may include rules associated with travel along the road segment. The program code instructions to provide for at least one of route guidance or autonomous vehicle control based on the retrieved data may include program code instructions to control a speed of the vehicle according to the rules associated with travel along the road segment.

Embodiments described herein may provide a method for establishing a location of a device based on a global navigation satellite system, and more particularly, to filtering the satellites used for establishing the location of the device based on an established likelihood of accuracy of the satellites. Methods may include: receiving sensor data of an environment of the apparatus; estimating object location within the environment based on the sensor data; receiving a static elevation mask; generating a learned-elevation mask based, at least in part, on the static elevation mask and the estimated object location within the environment; receiving signals from a plurality of Global Navigation Satellite System (GNSS) satellites; filtering the signals from the plurality of GNSS satellites to eliminate from consideration a subset of satellites established as not having a line-of-sight with the apparatus; establishing a location of the apparatus from remaining satellites established as having a line-of-sight with the apparatus; and providing for at least one of route guidance or autonomous vehicle control based on the established location of the apparatus.

Methods may include: retrieving at least one previously generated learned-elevation mask, where generating a learned-elevation mask based, at least in part, on the static elevation mask and the estimated object location within the environment includes generating a learned-elevation mask based, at least in part, on the static elevation mask, the estimated object location within the environment, and the at least one previously generated learned-elevation mask. The sensor data may be generated by at least one of an image sensor or a Light Distancing and Ranging (LiDAR) sensor. Estimating object location within the environment may include performing semantic segmentation on the sensor data to estimate a location of at least one of buildings, vegetation, and geological features within the environment.

Providing for at least one of route guidance or autonomous vehicle control based on the established location of the apparatus may include: map matching the established location with a road segment; retrieving data associated with the road segment in response to map matching the location of the apparatus to the road segment; and providing for at least one of route guidance or autonomous vehicle control based on the retrieved data associated with the road segment. The retrieved data associated with the road segment may include rules associated with travel along the road segment, and providing for at least one of route guidance or autonomous vehicle control based on the retrieved data may include controlling a speed of a vehicle according to the rules associated with travel along the road segment.

Embodiments described herein may provide an apparatus for establishing a location of a device based on a global navigation satellite system, and more particularly, to filtering the satellites used for establishing the location of the device based on an established likelihood of accuracy of the satellites. An example apparatus may include: means for receiving sensor data of an environment of the apparatus; means for estimating object location within the environment based on the sensor data; means for receiving a static elevation mask; means for generating a learned-elevation mask based, at least in part, on the static elevation mask and the estimated object location within the environment; means for receiving signals from a plurality of Global Navigation Satellite System (GNSS) satellites; means for filtering the signals from the plurality of GNSS satellites to eliminate from consideration a subset of satellites established as not having a line-of-sight with the apparatus; means for establishing a location of the apparatus from remaining satellites established as having a line-of-sight with the apparatus; and means for providing for at least one of route guidance or autonomous vehicle control based on the established location of the apparatus.

An example apparatus may include: means for retrieving at least one previously generated learned-elevation mask, where the means for generating a learned-elevation mask based, at least in part, on the static elevation mask and the estimated object location within the environment includes means for generating a learned-elevation mask based, at least in part, on the static elevation mask, the estimated object location within the environment, and the at least one previously generated learned-elevation mask. The sensor data may be generated by at least one of an image sensor or a Light Distancing and Ranging (LiDAR) sensor. The means for estimating object location within the environment may include performing semantic segmentation on the sensor data to estimate a location of at least one of buildings, vegetation, and geological features within the environment.

The means for providing for at least one of route guidance or autonomous vehicle control based on the established location of the apparatus may include: means for map matching the established location with a road segment; means for retrieving data associated with the road segment in response to map matching the location of the apparatus to the road segment; and means for providing for at least one of route guidance or autonomous vehicle control based on the retrieved data associated with the road segment. The retrieved data associated with the road segment may include rules associated with travel along the road segment, and the means for providing for at least one of route guidance or autonomous vehicle control based on the retrieved data may include means for controlling a speed of a vehicle according to the rules associated with travel along the road segment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
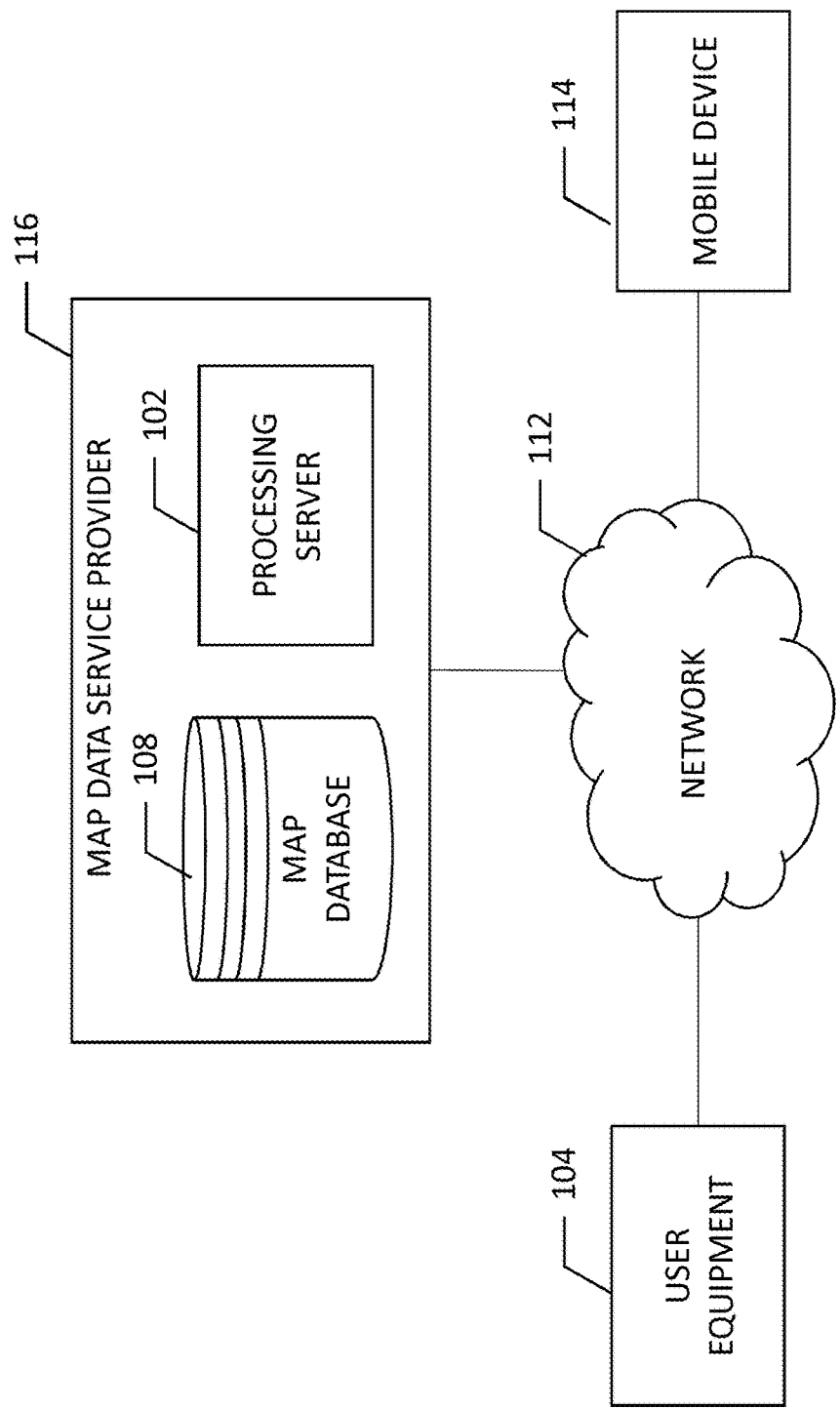
Figure 2:
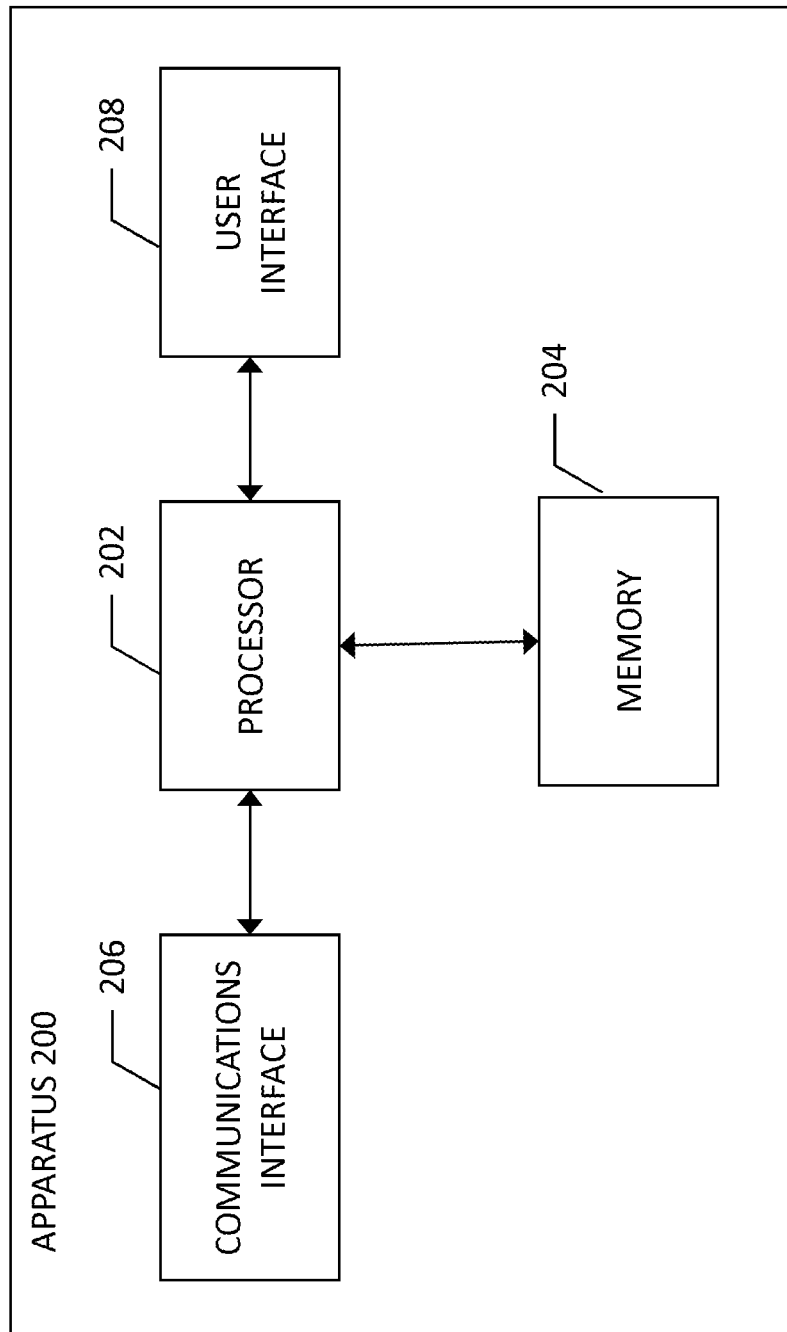
Figure 3:
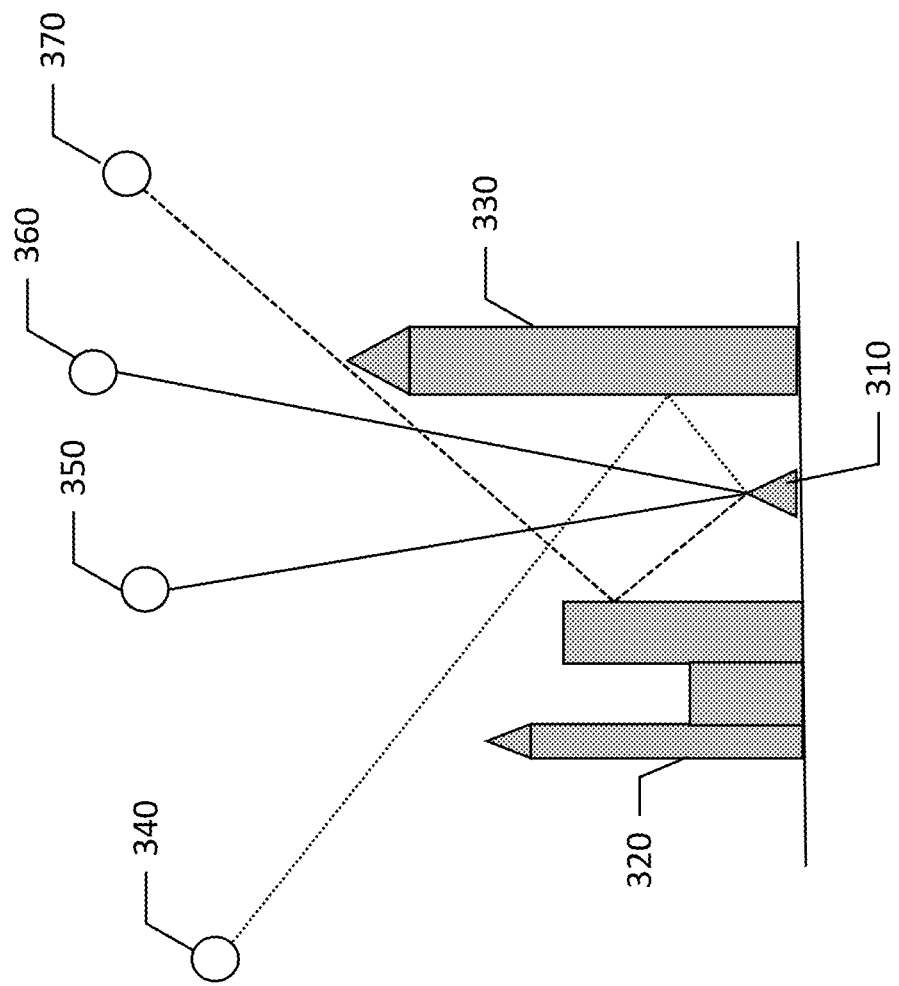
Figure 4:
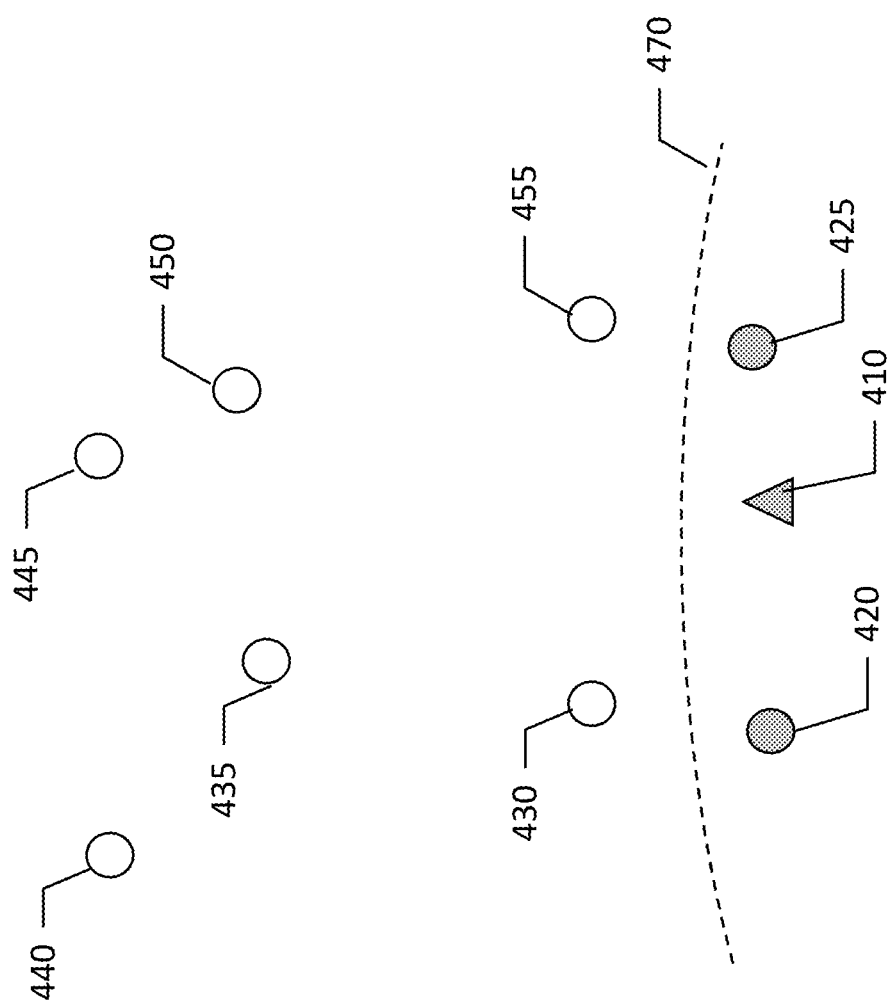
Figure 5:
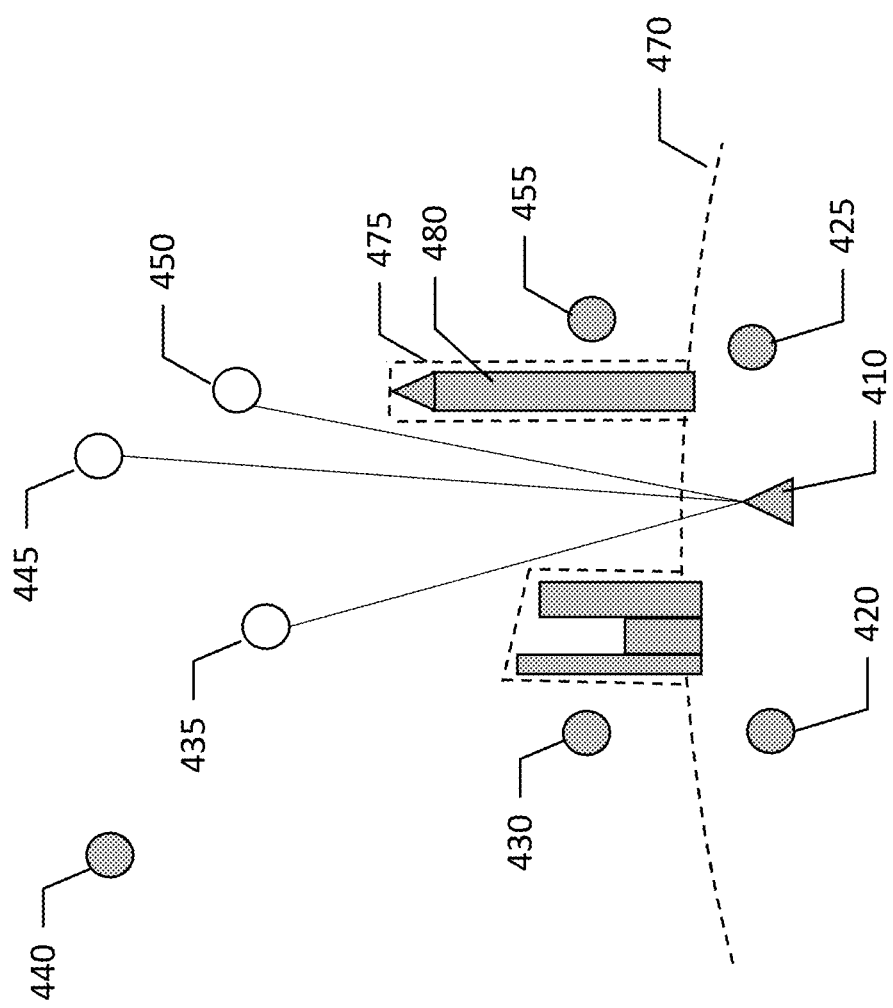
Figure 6:
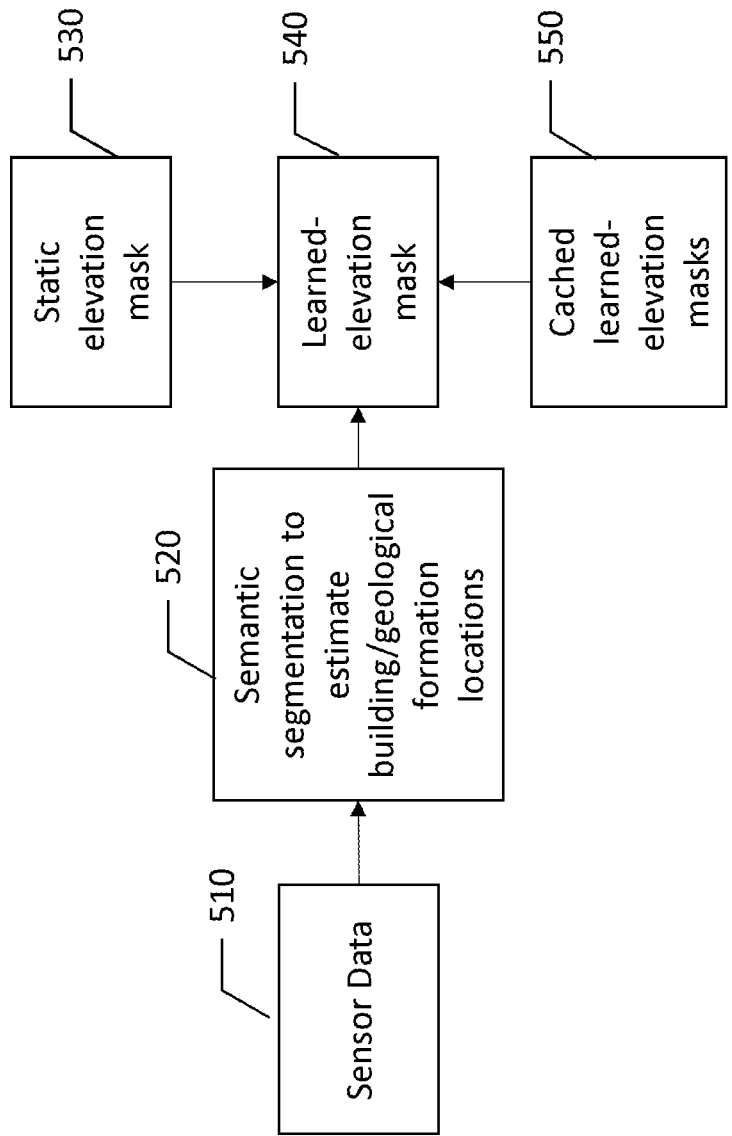
Figure 7:
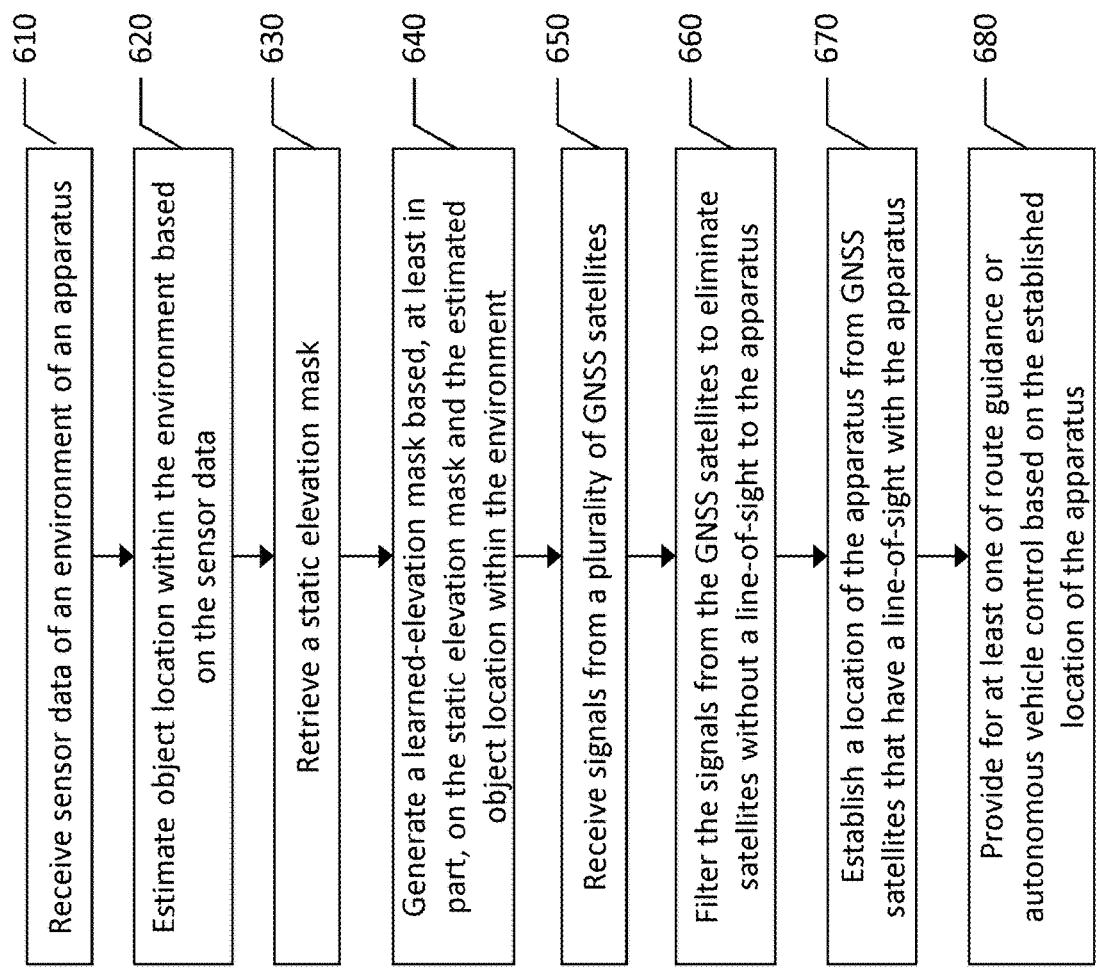

Having thus described example embodiments of the invention in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for generating and/or using a learned-elevation mask for establishing accurate location in accordance with an example embodiment of the present disclosure;

FIG. 3 depicts a Global Navigation Satellite System (GNSS) receiver positioned within an urban canyon relative to a plurality of GNSS satellites according to an example embodiment of the present disclosure;

FIG. 4 illustrates a GNSS receiver, a plurality of GNSS satellites, and a static elevation mask at the horizon according to an example embodiment of the present disclosure;

FIG. 5 illustrates a GNSS receiver, a plurality of GNSS satellites, and a learned-elevation mask according to an example embodiment of the present disclosure;

FIG. 6 illustrates a block diagram of processing information to filter satellites based on a learned-elevation mask according to an example embodiment of the present disclosure; and FIG. 7 is a flowchart of a method of filtering the satellites used for establishing the location of the device based on an established likelihood of accuracy of the satellites according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A method, apparatus, and computer program product are provided herein in accordance with an example embodiment for establishing a location of a device based on a global navigation satellite system, and more particularly, to filtering the satellites used for establishing the location of the device based on an established likelihood of accuracy of the satellites. FIG. 1 illustrates a communication diagram of an example embodiment of a system for implementing example embodiments described herein. The illustrated embodiment of FIG. 1 includes a map data service provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map data service provider system 116 may include computer systems and a network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map data service provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map data service provider in association with a services platform. By way of example, the map data service provider can collect geographic data to generate and enhance the map database 108. There can be different ways used by the map data service provider to collect data. These ways can include obtaining data from other sources, such as municipalities or respective geographic authorities. In addition, the map data service provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map data service provider. For example, a customer of the map data service provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and/or longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for establishing a location of a device based on a global navigation satellite system, and more particularly, to filtering the satellites used for establishing the location of the device based on an established likelihood of accuracy of the satellites. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for establishing a location of a device (e.g., user equipment 104) based on a global navigation satellite system, and more particularly, to filtering the satellites used for establishing the location of the device within a map (e.g., stored in map database 108) based on an established likelihood of accuracy of the satellites relative to the device. The use of satellites for navigational purposes relies upon geo-spatial positioning of an earth-bound device based on the signals received from a plurality of geo-synchronous satellites that are within signal range of the device. Global Navigation Satellite System (GNSS) generically encompasses a variety of satellite-based navigational systems, such as the Global Positioning System (GPS), Globalnaya Navigazionnaya Sputnikovaya Sistems (GLONASS). Galileo satellite navigation system, BeiDou navigation satellite system, and other regional systems. Each of these systems determines the location of an object or device based on satellite signals received from a plurality of satellites. An advantage to a plurality of satellites used in these systems is accuracy, redundancy, and availability.

While GNSS-based location establishment may be relatively accurate when a device has a clear line-of-sight with the GNSS satellites from which signals are received, establishing an accurate location when satellites do not have a clear line-of-sight may be difficult and the reliability and accuracy may be compromised. Further, even when one of a plurality of satellites used in establishing the location of a device does not have a clear line-of-sight the accuracy of the established location may be compromised and considered unreliable or not reliable enough for certain applications such as autonomous driving of a vehicle.

FIG. 3 illustrates an example of challenges faced by GNSS location systems. As shown, a device 310, which may be apparatus 20 such as a vehicle with a navigation system or a mobile computing device, for example, may be situated within an urban setting referred to herein as an "urban canyon" between tall buildings 320 and 330. While FIG. 3 illustrates a simplified example substantially in two dimensions, it is understood that real world applications exist in three dimensions and FIG. 3 is simplified for ease of understanding. Within an urban canyon as shown, the device 310 has line-of-sight to only two satellites: 350 and 360. The device 310 does not have line-of-sight with satellites 340 and 370, though the signals from each of these satellites may be reflected by buildings as shown and still received by the device 310. Conventional GNSS systems will receive signals and use the received signals to establish a location. However, as illustrated, the signals from satellite 340 and 370 are indirect and lead to errors in location estimation. As such, the estimation of a location of device 310 incorporating the signals from satellites 340 and 370 may be inaccurate to a substantial degree, such as on the order of feet or yards away from the actual location.

Embodiments described herein relate to identification of visible satellites or those with a line-of-sight to the device for which location is sought. When operating in a dense urban environment, among dense vegetation such as a forest or among trees, or within certain geological formations (e.g., canyons), buildings, vegetation, or geological features may block direct line-of-sight communication between the GNSS transponder of a device and one or more satellites, as illustrated in FIG. 3. A fixed-horizon filtering approach may be used to discard satellites located below a threshold of the visible horizon. However, the fixed filtering approach then presumes satellites above the horizon can contribute information during the position determination process. In the fixed-horizon filtering approach, occlusions toward the horizon that is atop the ground, such as buildings in urban environments, vegetation, or geological features, are not accounted for. This results in multipath reflections and signal attenuation resulting in inaccurate computing of GNSS locations.

Provided herein is a method of generating an adaptive, above-ground satellite horizon to filter out occluded satellites above the ground, referred to herein as a "learned-elevation mask". The learned-elevation mask can be used to augment the fixed horizon satellite filter. The learned-elevation mask may be computed on-the-fly using data from a camera equipped with horizon detection and semantic segmentation capabilities. Optionally, a digital elevation map of the environment with unfiltered GNSS location may be used for the learned-elevation mask. Offline implementation can use a cached-based system of learned-elevation masks that are computed from crowd-sourced data and applied to a current or future GNSS position.

A learned-elevation mask provides a mechanism to filter out satellites that are established to not have direct line-of-sight to a device. Such a learned-elevation mask may be able to filter out satellites 340 and 370 from FIG. 3 while using satellites 350 and 360 to establish a more accurate GNSS position. There are several ways in which a learned-elevation mask may be established. These methods may be used exclusive from one another or in combination to potentially improve or enhance the learned-elevation mask.

FIG. 4 illustrates an example embodiment in which a static elevation mask is used to filter satellites determined or estimated to be below the horizon. Device 410 which includes a GNSS antenna and receiver filters signals from satellites 420 and 425 below the static elevation mask 470 as being below the horizon, while satellites 430, 435, 440, 445, 450, and 455 are not filtered by a static elevation mask. FIG. 5 illustrates a similar arrangement of satellites and device 410, including buildings 480 in the environment of the device 410. A learned-elevation mask, as described herein, may go beyond the static elevation mask 470 of the horizon and include geographic or structural features, such as buildings 480, around which the learned-elevation mask 475 may exist. In such a scenario, any signals received from satellites 430, 440, 455 may be blocked or filtered out, even if received via reflection within the urban canyon. While this reduces the number of satellites contributing to the location determination of device 410, the remaining satellites are established as line-of-sight satellites such that they can be relied upon, and the accuracy of the location may be more definitively established.

A learned-elevation mask may be generated, at least in part, from sensors of a device. For example, an apparatus 200 may include a vehicle that includes an advanced driver assist system that features navigation and route guidance. The navigation may establish a position of the vehicle using GNSS to accurately position the vehicle on a map and to provide at least some degree of autonomous vehicle control or driver assistance (e.g., route guidance). Such a vehicle may also be equipped with sensors that may generally be used to facilitate autonomous vehicle control. Sensors such as image sensors or LiDAR (light distancing and ranging) sensors may be used by the vehicle to understand the surroundings or environment of the vehicle. Optionally, such sensors may be included in a device explicitly for the purpose of establishing a learned-elevation mask as described herein. The image sensors and/or LiDAR sensors may determine a type of environment of the vehicle, and may be able to provide a level of understanding of the environment of a vehicle to a system, such as the map data service provider 116 or to a processor 202 of the apparatus 200 itself. This understanding of the environment of the device may be used to build a learned-elevation mask.

For example, if a device determines it is surrounded by buildings, the device may establish that a learned-elevation mask is appropriate to improve the accuracy of the GNSS location estimation. Optionally, an approximate location within a geographic area may indicate to a device that a learned-elevation mask is appropriate. For example, if a location estimate or approximation indicates that a device is within Manhattan in New York City, a learned-elevation mask may be necessary to accurately establish a location of the device since the ubiquity of tall buildings block direct line-of-sight with GNSS satellites in many circumstances.

An elevation mask may be learned based on an understanding of the surroundings or environment of a device. Within a city, such as within New York City and specifically Manhattan, the buildings may be mapped in three dimensions. This three-dimensional mapping of buildings may allow a learned-elevation mask to be readily generated based on the understanding of the buildings around the device.

Learned-elevation masks once established through sensors of an apparatus such as a vehicle, may be stored in a memory, such as memory 204 of the apparatus 200 or in map database 108 of the map data service provider 116 to benefit other apparatuses traveling along a similar path. These may be cached learned-elevation masks such that vehicles or apparatuses, even those lacking sufficient sensors to generate their own learned-elevation masks may use cached elevation masks to filter out GNSS satellites that are more likely to be of diminished accuracy through a lack of line-of-sight.

FIG. 6 illustrates a block diagram of the processing of data for using a learned-elevation mask to improve the accuracy of location determination according to an example embodiment of the present disclosure. As shown, sensor data is received at 510 from sensors of an apparatus, such as a vehicle with a sensor package that may facilitate autonomous vehicle control. The sensor data may be from image sensors or LiDAR sensors, for example. The sensor data is processed using semantic segmentation to estimate building, vegetation, or geological formation locations within the environment of the apparatus. The data may be processed locally on the apparatus, such as by processor 202 of apparatus 200, or may be processed on a server, such as by map data service provider 116 using processing server 102. A fixed satellite horizon or static elevation mask may be retrieved at 530, which may be retrieved from local memory (e.g., memory 204) or from a server (e.g., from map database 108). Using the fixed satellite horizon and the estimated building, vegetation, or geological formation locations, a learned satellite mask may be generated at 540, such as the learned-elevation mask of FIG. 5. Cached learned elevation masks 550 may be used to inform the generated learned-elevation mask such that the accuracy of a learned-elevation mask may be generated and cached. Not all apparatuses will have the sensor capabilities to sense their environment to inform a learned-elevation mask, in which case the processing may be limited to the fixed elevation mask of 530 combined with the cached learned-elevation masks 550 to establish an elevation mask to be used by the apparatus.

Embodiments described herein serve to improve the accuracy with which location is determined, particularly using GNSS location systems. For purposes of verifying and/or updating road map geometry, it may be desirable to identify a position of a particular apparatus or probe. Such a position may also be used to support various navigation operations, routing functionality, assisted-driving technology, and/or the like.

Establishing an accurate location for an apparatus may be critical in some circumstances, such as in navigation or route guidance, or in autonomous vehicle control. Establishing an accurate location may allow a vehicle associated with the apparatus to map-match the location to a road segment in order to accurately place the vehicle on a road within a network of roads. In densely populated areas with a relatively high concentration of roadways within a confined space, location accuracy may be critical in order to establish the proper route guidance for a user. Further, establishing an accurate location through map matching may enable an autonomous vehicle to retrieve map data relating to the road segment on which the vehicle associated with the apparatus is traveling. Accurate map matching to a road segment may be instrumental for some autonomous vehicle control. For example, a highway or limited access freeway may have a speed limit of 70 miles per hour, while a service road adjacent to the highway may have a speed limit of 25 miles per hour due to a commercial or residential nature of the service road. Mis-identifying a road segment as freeway or adjacent service road may indicate that the road along which a vehicle is traveling has a substantially different speed limit than actually present. As such, accurate location identification may be critical for a variety of reasons. According to an example embodiment, upon establishing an accurate location using methods described herein, a location of the apparatus may be map-matched and a vehicle associated with the apparatus controlled according to rules set for the map-matched road segment.

FIG. 7 illustrates a flowchart depicting a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 7 illustrates a flowchart of a method for establishing a location of a device based on a global navigation satellite system, and more particularly, to filtering the satellites used for establishing the location of the device based on an established likelihood of accuracy of the satellites. According to the flowchart of FIG. 7, sensor data relating to an environment of an apparatus is received at 610. Object locations are estimated within the environment based on the sensor data at 620. This identifies any objects and their respective locations proximate the sensor. A static elevation mask may be received at 630 which may identify the horizon below which GNSS satellite signals are discounted or not considered when establishing a position since they cannot reasonably be presumed to have a line-of-sight to the apparatus. At 640, a learned-elevation mask is generated based, at least in part, on the static elevation mask and the estimated object location(s) within the environment. This learned-elevation mask goes beyond the horizon mask to discount GNSS satellite signals from satellites that are estimated to not have a direct line-of-sight to the apparatus. Signals are received from a plurality of GNSS satellites at 650, while signals from the GNSS satellites that are estimated to not have a line-of-sight to the apparatus are filtered out at 660. A location of the apparatus is established at 670 using only signals from GNSS satellites having a line-of-sight to the apparatus. At 680, route guidance or autonomous vehicle control is provided based on the established location of the apparatus.

In an example embodiment, an apparatus for performing the method of FIG. 10 above may comprise a processor (e.g., the processor 202) configured to perform some or each of the operations (610-680) described above. The processor may, for example, be configured to perform the operations (610-680) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-680 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus to facilitate autonomous or semi-autonomous control of a vehicle comprising at least one processor and at least one non-transitory memory including computer program code instructions stored thereon, the computer program code instructions configured to, when executed, cause the apparatus to at least:
   receive sensor data of an environment of an object;
   estimate the object location within the environment based on the sensor data;
   retrieve a static elevation mask associated with the estimated object location;
   determine, from the estimated object location, that a learned-elevation mask is appropriate;
   generate the learned-elevation mask using semantic segmentation of the sensor data of the environment of the object based, at least in part, on the static elevation mask and the estimated object location within the environment in response to determining that the learned-elevation mask is appropriate;
   receive signals from a plurality of Global Navigation Satellite System (GNSS) satellites;
   filter the signals from the plurality of GNSS satellites to eliminate from consideration a subset of satellites established as not having a line-of-sight with the object;
   establish a location of the object from remaining satellites established as having a line-of-sight with the object; and
   provide for at least one of route guidance or autonomous vehicle control based on the established location of the object.

2. The apparatus of claim 1, wherein the apparatus is further caused to retrieve at least one previously generated learned-elevation mask, wherein causing the apparatus to generate a learned-elevation mask based, at least in part, on the static elevation mask and the estimated object location within the environment comprises causing the apparatus to generate a learned-elevation mask based, at least in part, on the static elevation mask, the estimated object location within the environment, and the at least one previously generated learned-elevation mask.

3. The apparatus of claim 1, wherein the sensor data is generated by at least one of an image sensor or a Light Distancing and Ranging (LiDAR) sensor.

4. The apparatus of claim 3, wherein the at least one of an image sensor or LiDAR sensor is associated with the vehicle.

5. The apparatus of claim 1, wherein causing the apparatus to generate the learned-elevation mask comprises causing the apparatus to perform the semantic segmentation on the sensor data of the environment and employ a three-dimensional map of the environment to estimate a location of at least one of buildings, vegetation, or geological features within the environment for the learned-elevation mask.

6. The apparatus of claim 1, wherein causing the apparatus to provide for at least one of route guidance or autonomous vehicle control based on the established location of the apparatus comprises causing the apparatus to:
   map match the established location with a road segment;
   retrieve data associated with the road segment in response to map matching the location of the object to the road segment; and
   provide for at least one of route guidance or autonomous vehicle control based on the retrieved data associated with the road segment.

7. The apparatus of claim 6, wherein the retrieved data associated with the road segment comprises rules associated with travel along the road segment, and causing the apparatus to provide for at least one of route guidance or autonomous vehicle control based on the retrieved data comprises causing the apparatus to control a speed of the vehicle according to the rules associated with travel along the road segment.

8. A computer program product comprising at least one non-transitory computer-readable storage medium having computer-executable program code instructions stored therein, the computer-executable program code instructions comprising program code instructions to:
   receive sensor data of an environment of an object;
   estimate the object location within the environment based on the sensor data;
   retrieve a static elevation mask associated with the estimated object location;
   determine, from the estimated object location, that a learned-elevation mask is appropriate;

generate the learned-elevation mask using semantic segmentation of the sensor data of the environment of the object based, at least in part, on the static elevation mask and the estimated object location within the environment in response to determining that the learned-elevation mask is appropriate;

receive signals from a plurality of Global Navigation Satellite System (GNSS) satellites;

filter the signals from the plurality of GNSS satellites to eliminate from consideration a subset of satellites established as not having a line-of-sight with the object;

establish a location of the object from remaining satellites established as having a line-of-sight with the object; and provide for at least one of route guidance or autonomous vehicle control based on the established location of the object.

9. The computer program product of claim 8, further comprising program code instructions to retrieve at least one previously generated learned-elevation mask, wherein the program code instructions to generate a learned-elevation mask based, at least in part, on the static elevation mask and the estimated object location within the environment comprise program code instructions to generate a learned-elevation mask based, at least in part, on the static elevation mask, the estimated object location within the environment, and the at least one previously generated learned-elevation mask.

10. The computer program product of claim 8, wherein the sensor data is generated by at least one of an image sensor or a Light Distancing and Ranging (LiDAR) sensor.

11. The computer program product of claim 10, wherein the at least one of an image sensor or LiDAR sensor is associated with a vehicle.

12. The computer program product of claim 8, wherein the program code instructions to generate the learned-elevation mask comprise program code instructions to perform the semantic segmentation on the sensor data of the environment and employ a three-dimensional map of the environment to estimate a location of at least one of buildings, vegetation, or geological features within the environment for the learned-elevation mask.

13. The computer program product of claim 8, wherein program code instructions to provide for at least one of route guidance or autonomous vehicle control based on the established location of the apparatus comprise program code instructions to:

map match the established location with a road segment;

retrieve data associated with the road segment in response to map matching the location of the object to the road segment; and provide for at least one of route guidance or autonomous vehicle control based on the retrieved data associated with the road segment.

14. The computer program product of claim 13, wherein the retrieved data associated with the road segment comprises rules associated with travel along the road segment, and the program code instructions to provide for at least one of route guidance or autonomous vehicle control based on the retrieved data comprise program code instructions to control a speed of the vehicle according to the rules associated with travel along the road segment.

15. A method comprising:

receiving sensor data of an environment of an object;

estimating the object location within the environment based on the sensor data;

retrieving a static elevation mask associated with the estimated object location;

determining, from the estimated object location, that a learned-elevation mask is appropriate;

generating the learned-elevation mask using semantic segmentation of the sensor data of the environment of the object based, at least in part, on the static elevation mask and the estimated object location within the environment in response to determining that the learned-elevation mask is appropriate;

receiving signals from a plurality of Global Navigation Satellite System (GNSS) satellites;

filtering the signals from the plurality of GNSS satellites to eliminate from consideration a subset of satellites established as not having a line-of-sight with the object;

establishing a location of the object from remaining satellites established as having a line-of-sight with the object; and providing for at least one of route guidance or autonomous vehicle control based on the established location of the object.

16. The method of claim 15, further comprising: retrieving at least one previously generated learned-elevation mask, wherein generating a learned-elevation mask based, at least in part, on the static elevation mask and the estimated object location within the environment comprises generating a learned-elevation mask based, at least in part, on the static elevation mask, the estimated object location within the environment, and the at least one previously generated learned-elevation mask.

17. The method of claim 15, wherein the sensor data is generated by at least one of an image sensor or a Light Distancing and Ranging (LiDAR) sensor.

18. The method of claim 15, wherein generating the learned-elevation mask comprises performing the semantic segmentation on the sensor data of the environment and employing a three-dimensional map of the environment to estimate a location of at least one of buildings, vegetation, or geological features within the environment for the learned-elevation mask.

19. The method of claim 15, wherein providing for at least one of route guidance or autonomous vehicle control based on the established location of the apparatus comprises:

map matching the established location with a road segment;

retrieving data associated with the road segment in response to map matching the location of the object to the road segment; and providing for at least one of route guidance or autonomous vehicle control based on the retrieved data associated with the road segment.

20. The method of claim 19, wherein the retrieved data associated with the road segment comprises rules associated with travel along the road segment, and providing for at least one of route guidance or autonomous vehicle control based on the retrieved data comprises controlling a speed of a vehicle according to the rules associated with travel along the road segment.

* * * * *